(12) United States Patent
Han et al.

(10) Patent No.: US 10,785,698 B2
(45) Date of Patent: Sep. 22, 2020

(54) PASSIVE SENSOR NETWORKING PROTOCOL

(71) Applicant: SOUTH UNIVERSITY OF SCIENCE AND TECHNOLOGY OF CHINA, Guangdong (CN)

(72) Inventors: Zidong Han, Guangdong (CN); Yi Gong, Guangdong (CN); Chenghao Zheng, Guangdong (CN)

(73) Assignee: SOUTH UNIVERSITY OF SCIENCE & TECHNOLOGY OF CHINA, Shenzhen (CN)

( * ) Notice: Subject to any disclaimer, the term of this patent is extended or adjusted under 35 U.S.C. 154(b) by 58 days.

(21) Appl. No.: 16/215,160

(22) Filed: Dec. 10, 2018

(65) Prior Publication Data

US 2019/0182744 A1    Jun. 13, 2019

Related U.S. Application Data (63) Continuation of application No. PCT/CN2016/094223, filed on Aug. 9, 2016.

(30) Foreign Application Priority Data

Aug. 2, 2016    (CN) .......................... 2016 1 0624359

(51) Int. Cl.
*H04W 40/10*    (2009.01)
*H04L 29/08*    (2006.01)
(Continued)

(52) U.S. Cl.
CPC ............. *H04W 40/10* (2013.01); *H04L 67/12* (2013.01); *H04W 52/0261* (2013.01); *H04W 84/20* (2013.01)

(58) Field of Classification Search
CPC ..... H04W 52/02; H04W 84/20; H04W 40/10; H04W 52/0261; H04L 67/12
See application file for complete search history.

(56) References Cited

U.S. PATENT DOCUMENTS 7,002,470 B1 *    2/2006    Miao .................... G08B 25/009
                                                        340/539.1
2006/0120303 A1 *    6/2006    Yarvis .................... H04L 45/04
                                                        370/254
(Continued)

FOREIGN PATENT DOCUMENTS

| CN | 102958130 A | 3/2013 |
|---|---|---|
| CN | 104469878 A | 3/2015 |
| WO | 2007/104008 A2 | 9/2007 |

OTHER PUBLICATIONS

International search report issued by the International Searching Authority for corresponding International Patent Application No. PCT/CN2016/094223, dated Mar. 3, 2017, with an English translation.

(Continued)

*Primary Examiner* — Chi Ho A Lee
*Assistant Examiner* — Andrew Lee
(74) *Attorney, Agent, or Firm* — Myers Wolin, LLC (57) ABSTRACT

Disclosed is a control method for controlling data return in a passive sensor network comprising an aggregation node and sensor nodes. The control method comprises the following steps: controlling the aggregation node to broadcast energy to the entire passive sensor network; controlling the sensor nodes to collect the energy broadcast by the aggregation node; clustering, according to a predetermined clustering rule, the sensor nodes and selecting cluster heads; and controlling each of the sensor nodes of each cluster to transmit data to a corresponding cluster head and then to the aggregation node or one of the sensor nodes of a cluster
(Continued)

AA controlling the aggregation node to spread energy to the entire passive sensor network
BB controlling the sensor nodes to collect the energy spread by the aggregation node
CC clustering the sensor nodes and selecting cluster heads according to a predetermined clustering rule
DD controlling each of the sensor nodes of each cluster to transmit data to a corresponding cluster head and then to the aggregation node or one of the sensor nodes of a cluster closer to the aggregation node so as to eventually transmit the data to the aggregation node, and closing the sensor node that completes data transmission closer to the aggregation node so as to eventually transmit the data to the aggregation node and closing the sensor node that completes data transmission. In addition, a control device is also disclosed.

12 Claims, 6 Drawing Sheets

(51) Int. Cl.
*H04W 52/02* (2009.01)
*H04W 84/20* (2009.01)

(56) References Cited

U.S. PATENT DOCUMENTS

| | | | |
|---|---|---|---|
| 2007/0211681 A1 | 9/2007 | Sun et al. | |
| 2009/0092112 A1 | 4/2009 | Kim et al. | |
| 2009/0285140 A1 | 11/2009 | Kim et al. | |
| 2010/0074133 A1* | 3/2010 | Kim | H04J 3/0682 |
| | | | 370/252 |
| 2010/0125437 A1* | 5/2010 | Vasseur | H04L 43/10 |
| | | | 702/188 |
| 2010/0220653 A1* | 9/2010 | Hwang | H04W 40/22 |
| | | | 370/328 |
| 2011/0055424 A1* | 3/2011 | Jiang | H04W 40/32 |
| | | | 709/238 |
| 2013/0195072 A1* | 8/2013 | Zhu | H04L 5/0094 |
| | | | 370/330 |
| 2014/0064126 A1* | 3/2014 | Lim | G01S 5/0257 |
| | | | 370/252 |
| 2015/0195780 A1* | 7/2015 | Liu | H04W 52/0203 |
| | | | 370/311 |
| 2016/0007288 A1* | 1/2016 | Samardzija | H04W 56/001 |
| | | | 370/311 |
| 2016/0143077 A1* | 5/2016 | Fodor | H04W 72/06 |
| | | | 370/329 |
| 2016/0295435 A1* | 10/2016 | Baroudi | H04L 41/12 |
| 2018/0302815 A1* | 10/2018 | Baroudi | H04W 24/08 |

OTHER PUBLICATIONS

Singh, S.K. et al., "A Survey of Energy-Efficient Hierarchical Cluster-Based Routing in Wireless Sensor Networks," International Journal of Advanced Networking and Applications, Jun. 1, 2010, pp. 570-580, vol. 02, Issue 02.

\* cited by examiner

AA controlling the aggregation node to spread energy to the entire passive sensor network
BB controlling the sensor nodes to collect the energy spread by the aggregation node
CC clustering the sensor nodes and selecting cluster heads according to a predetermined clustering rule
DD controlling each of the sensor nodes of each cluster to transmit data to a corresponding cluster head and then to the aggregation node or one of the sensor nodes of a cluster closer to the aggregation node so as to eventually transmit the data to the aggregation node, and closing the sensor node that completes data transmission

AA  controlling the aggregation node to spread energy to the entire passive sensor network
BB  controlling the sensor nodes to collect the energy spread by the aggregation node
CC  clustering the sensor nodes and selecting cluster heads according to a predetermined clustering rule
DDA whether a current energy of each of the sensor nodes is greater than or equal to an energy required for dormancy
DDB controlling the sensor node to enter a dormant mode
DDC turning off the sensor node

Fig. 3

AA  controlling the aggregation node to spread energy to the entire passive sensor network
BB  controlling the sensor nodes to collect the energy spread by the aggregation node
CC  clustering the sensor nodes and selecting cluster heads according to a predetermined clustering rule
DDA whether a current energy of each of the sensor nodes is greater than or equal to an energy required for dormancy
DDB controlling the sensor node to enter a dormant mode
DDC turning off the sensor node
DDD comparing a distance between the corresponding cluster head and the aggregation node with a distance between any of other sensor nodes and the aggregation node so as to determine the one of the sensor nodes of a cluster closer to the aggregation node

PASSIVE SENSOR NETWORKING PROTOCOL

CROSS REFERENCE TO RELATED APPLICATIONS

This application is a continuation of International Application No. PCT/CN2016/094223, filed on Aug. 9, 2016, which takes priority from Chinese Patent Application No. 201610624359.5, filed on Aug. 2, 2016, the contents of each of which are incorporated by reference herein.

TECHNICAL FIELD

The present disclosure relates to a wireless sensor network technology, and more particularly, to a control method and a control device.

BACKGROUND

The demands for wireless sensor networks will become more and more extensive with the development of informatization. However, sensor nodes in wireless sensor networks are generally miniaturized devices powered by batteries, their limited power limits their application in some special fields, such as some places that are difficult for human to reach, including ocean, desert and even nuclear radiation areas. Therefore, a new passive wireless sensor network becomes imminent.

Some researches have been carried out on such type of passive sensor network at home and abroad; for example, a method mainly used at abroad is to receive and modulate the energy broadcast by an aggregation node and then reflect the energy to the aggregation node through the ambient backscatter of the sensor node. While a method mainly used in china is to collect the weak energy emitted by the sensor node in the environment, and to transmit the information to the sink after the energy is accumulated to a sufficient amount. However, both methods have fatal defects. The first method simply modulates the incident wave and then reflects it back, which lacks sufficient routing structure and coding mode, and in order to achieve a satisfactory result, a high power requirement for a RF source will be needed. The second method needs an amount of time to enable the sensor node to accumulate enough energy, the method needs to collect the energy in the environment, and if the energy in the environment changes, the sensor node will be unstable.

SUMMARY

The present disclosure is intended to solve at least one of existing technical problems in the prior art. For this purpose, the present disclosure needs to provide a control method and a control device.

The control method in the embodiment of the present disclosure is used for controlling data return in a passive sensor network comprising an aggregation node and sensor nodes; and the control method includes the following steps:

an energy broadcasting step of controlling the aggregation node to broadcast energy to the entire passive sensor network;

an energy collecting step of controlling the sensor nodes to collect the energy broadcast by the aggregation node;

a clustering step of clustering the sensor nodes and selecting cluster heads according to a predetermined clustering rule; and a data transmitting step of controlling each of the sensor nodes of each cluster to transmit data to a corresponding cluster head and then to the aggregation node or one of the sensor nodes of a cluster closer to the aggregation node so as to eventually transmit the data to the aggregation node, and closing the sensor node that completes data transmission.

In some embodiments, the data includes at least one of the data collected by the sensor node itself and the data transmitted by other sensor nodes.

In some embodiments, the data transmitting step specifically includes:

judging whether a current energy of each of the sensor nodes is greater than or equal to an energy required for dormancy after the data is transmitted by each of the sensor nodes;

controlling the sensor node to enter a dormant mode when the current energy is greater than or equal to the energy required for dormancy; and controlling to temporarily turn off the sensor node when the current energy is less than the energy required for dormancy.

In some embodiments, the data transmitting step specifically includes:

comparing a distance between the corresponding cluster head and the aggregation node with a distance between any of other sensor nodes and the aggregation node so as to determine the one of the sensor nodes of a cluster closer to the aggregation node.

In some embodiments, the data transmitting step specifically includes:

judging whether the one of the sensor nodes of a cluster closer to the aggregation node is the cluster head; and when the one of the sensor nodes of a cluster closer to the aggregation node is not the cluster head, transmitting the data to the cluster head preferably so as to finally transmit the data to the aggregation node.

In some embodiments, the data transmitting step specifically includes:

judging whether the one of the sensor nodes of a cluster closer to the aggregation node survives;

when the one of the sensor nodes of a cluster closer to the aggregation node survives, judging whether a distance between the one of the sensor nodes of a cluster closer to the aggregation node and the aggregation node is less than a predetermined distance; and when the distance between the one of the sensor nodes of a cluster closer to the aggregation node and the aggregation node is less than the predetermined distance, controlling the one of the sensor nodes of a cluster closer to the aggregation node to transmit the data to the aggregation node.

The control device in the embodiment of the present disclosure is used for controlling data return in a passive sensor network comprising an aggregation node and sensor nodes; and the control device includes:

an energy broadcasting module configured to control the aggregation node to broadcast energy to the entire passive sensor network;

an energy collecting module configured to control the sensor node to collect the energy broadcast by the aggregation node;

a clustering module configured to cluster the sensor nodes and select cluster heads according to a predetermined clustering rule; and a data transmitting module configured to control each of the sensor nodes of each cluster to transmit data to a corresponding cluster head and then to the aggregation node or one of the sensor nodes of a cluster closer to the aggregation node so as to eventually transmit the data to the aggregation node, and close the sensor node that completes data transmission.

In some embodiments, the data comprises at least one of the data collected by the sensor node itself and the data transmitted by other sensor nodes.

In some embodiments, the data transmitting module includes:

a first judging module configured to judge whether a current energy of each of the sensor nodes is greater than or equal to an energy required for dormancy after the data is transmitted by each of the sensor nodes;

a first control module configured to control the sensor node to enter a dormant mode when the current energy is greater than or equal to the energy required for dormancy; and a second control module configured to control to temporarily turn off the sensor node when the current energy is less than the energy required for dormancy.

In some embodiments, the data transmitting module includes:

a comparing module configured to compare a distance between the corresponding cluster head and the aggregation node with a distance between any of other sensor nodes and the aggregation node so as to determine the one of the sensor nodes of a cluster closer to the aggregation node.

In some embodiments, the data transmitting module includes:

a second judging module configured to judge whether the one of the sensor nodes of a cluster closer to the aggregation node is the cluster head.

The data transmitting module is configured to, when the one of the sensor nodes of a cluster closer to the aggregation node is not the cluster head, transmit the data to the cluster head preferably so as to finally transmit the data to the aggregation node.

In some embodiments, the data transmitting module includes:

a third judging module configured to judge whether the one of the sensor nodes of a cluster closer to the aggregation node survives; and a fourth judging module configured to, when the one of the sensor nodes of a cluster closer to the aggregation node survives, judge whether a distance between the one of the sensor nodes of a cluster closer to the aggregation node and the aggregation node is less than a predetermined distance.

The data transmitting module is configured to, when the distance between the one of the sensor nodes of a cluster closer to the aggregation node and the aggregation node is less than the predetermined distance, control the one of the sensor nodes of a cluster closer to the aggregation node to transmit the data to the aggregation node.

The control method and the control device in the embodiment of the present disclosure enable each of the sensor nodes in the network to transmit useful data to the aggregation node with maximum probability by controlling the sensor nodes to return data.

The additional aspects and advantages of the present disclosure will be partially given in the following description, some will become apparent from the following description, or will be understood through the practice of the present disclosure.

BRIEF DESCRIPTION OF THE DRAWINGS

The above and/or additional aspects and advantages of the present disclosure will become apparent and easily understood from the description to the embodiments with reference to the following drawings, wherein.

DETAILED DESCRIPTION

Reference will now be made in detail to exemplary embodiments, examples of which are illustrated in the accompanying drawings, in which the same or similar reference numbers throughout the drawings represent the same or similar elements or elements having same or similar functions.

Embodiments described below with reference to drawings are merely exemplary and used for explaining the present disclosure, and should not be understood as limitation to the present disclosure.

Figure 1:
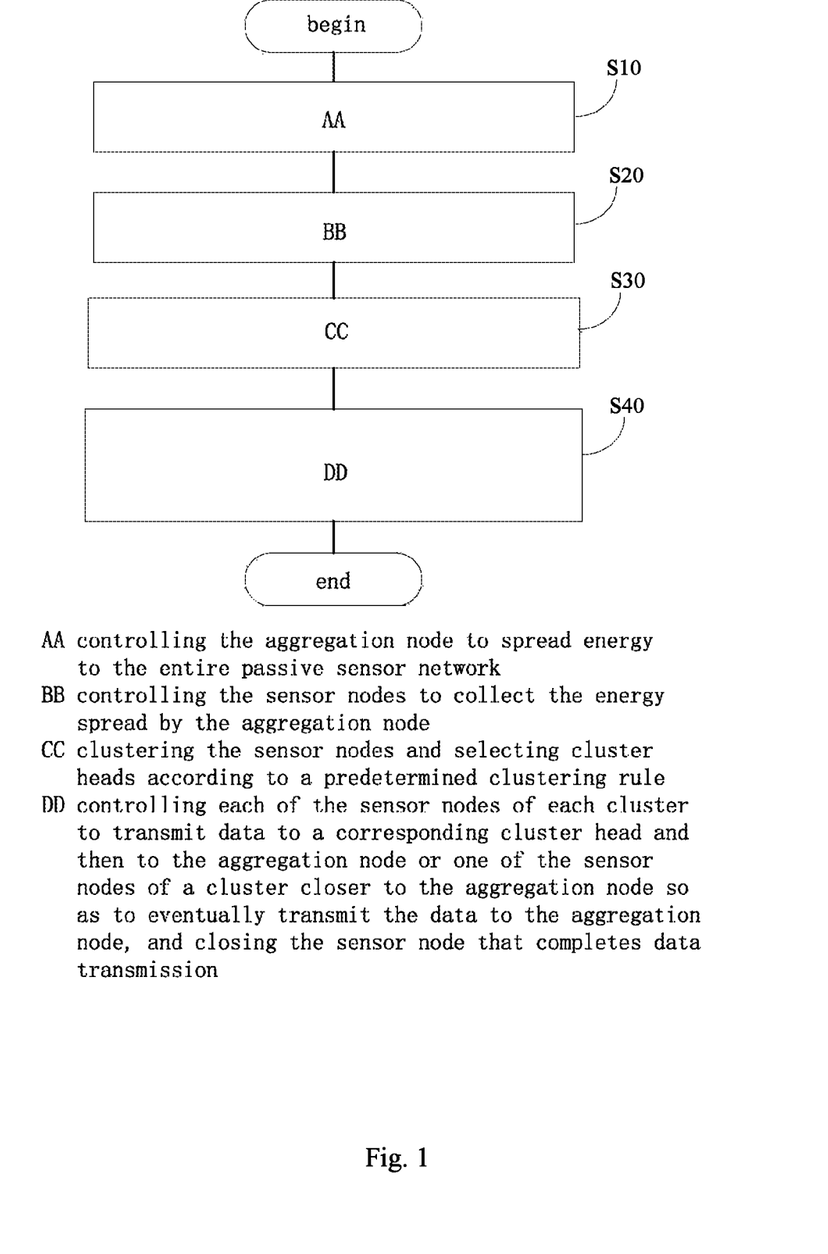
FIG. 1 is a flow chart of a control method according to an embodiment of the present disclosure.

With reference to FIG. 1, the control method in the embodiment of the present disclosure is used for controlling data return in a passive sensor network, and the passive sensor network includes an aggregation node and sensor nodes. The control method includes the following steps:

an energy broadcasting step S10 of controlling the aggregation node to broadcast energy to the entire passive sensor network;

an energy collecting step S20 of controlling the sensor nodes to collect the energy broadcast by the aggregation node;

a clustering step S30 of clustering the sensor nodes and selecting cluster heads according to a predetermined clustering rule; and a data transmitting step S40 of controlling each of the sensor nodes of each cluster to transmit data to a corresponding cluster head and then to the aggregation node or one of the sensor nodes of a cluster closer to the aggregation node so as to eventually transmit the data to the aggregation node, and closing the sensor node that completes data transmission.

Figure 2:
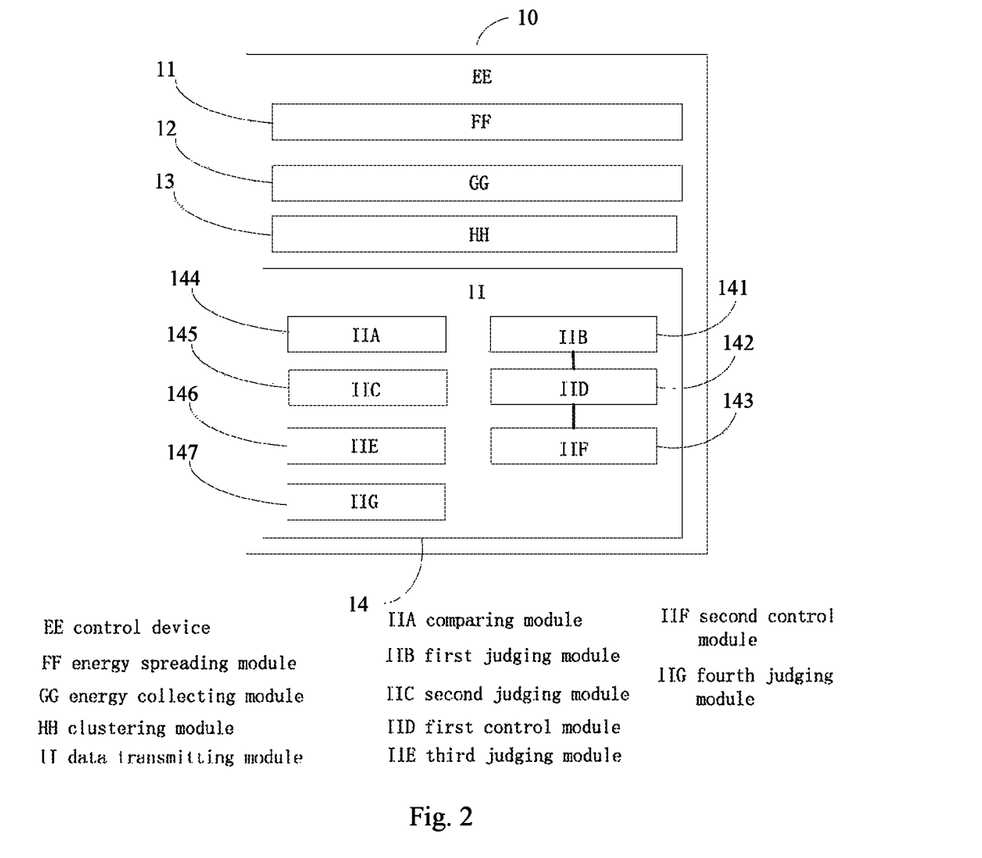
FIG. 2 is a diagram of functional modules of a control device according to an embodiment of the present disclosure.

Referring to FIG. 2, the control device 10 in the embodiment of the present disclosure includes an energy broadcasting module 11, an energy collecting module 12, a clustering module 13 and a data transmitting module 14.

The control method in the embodiment of the present disclosure can be realized by the control device 10 in the embodiment of the present disclosure, for example, the energy broadcasting step S10 can be realized by the energy broadcasting module 11, the energy collecting step S20 can be realized by the energy collecting module 12, the clustering step S30 can be realized by the clustering module 13, and the data transmitting step S40 can be realized by the data transmitting module 14.

In other words, the energy broadcasting module 11 can be configured to control the aggregation node to broadcast energy to the entire passive sensor network. The energy collecting module 12 can be configured to control the sensor nodes to collect the energy broadcast by the aggregation node. The clustering module 13 can be configured to cluster the sensor nodes and select cluster heads according to a predetermined clustering rule. The data transmitting module 14 can be configured to control the sensor nodes of each cluster to transmit data to the corresponding cluster head and then to the aggregation node or one of the sensor nodes of a cluster closer to the aggregation node so as to eventually transmit the data to the aggregation node, and close the sensor node that completes data transmission.

The control method and the control device 10 in the embodiment of the present disclosure enable each of the sensor nodes in the network to transmit useful data to the aggregation node with maximum probability by controlling the sensor nodes to return data.

It needs to be understood that the sensor nodes in the embodiment of the present disclosure include the cluster heads.

In some embodiments, the data comprises at least one of the data collected by the sensor node itself and the data transmitted by other sensor nodes.

For example, the sensor node only transmit the data collected by itself when the sensor node is the outermost sensor node, and the sensor node transmit both the data collected by the sensor node and the data transmitted by other sensor nodes when the number of data transmission is two or more. In this way, the data can be transmitted layer by layer, so that the useful data can be completely transmitted to the aggregation node.

Figure 3:
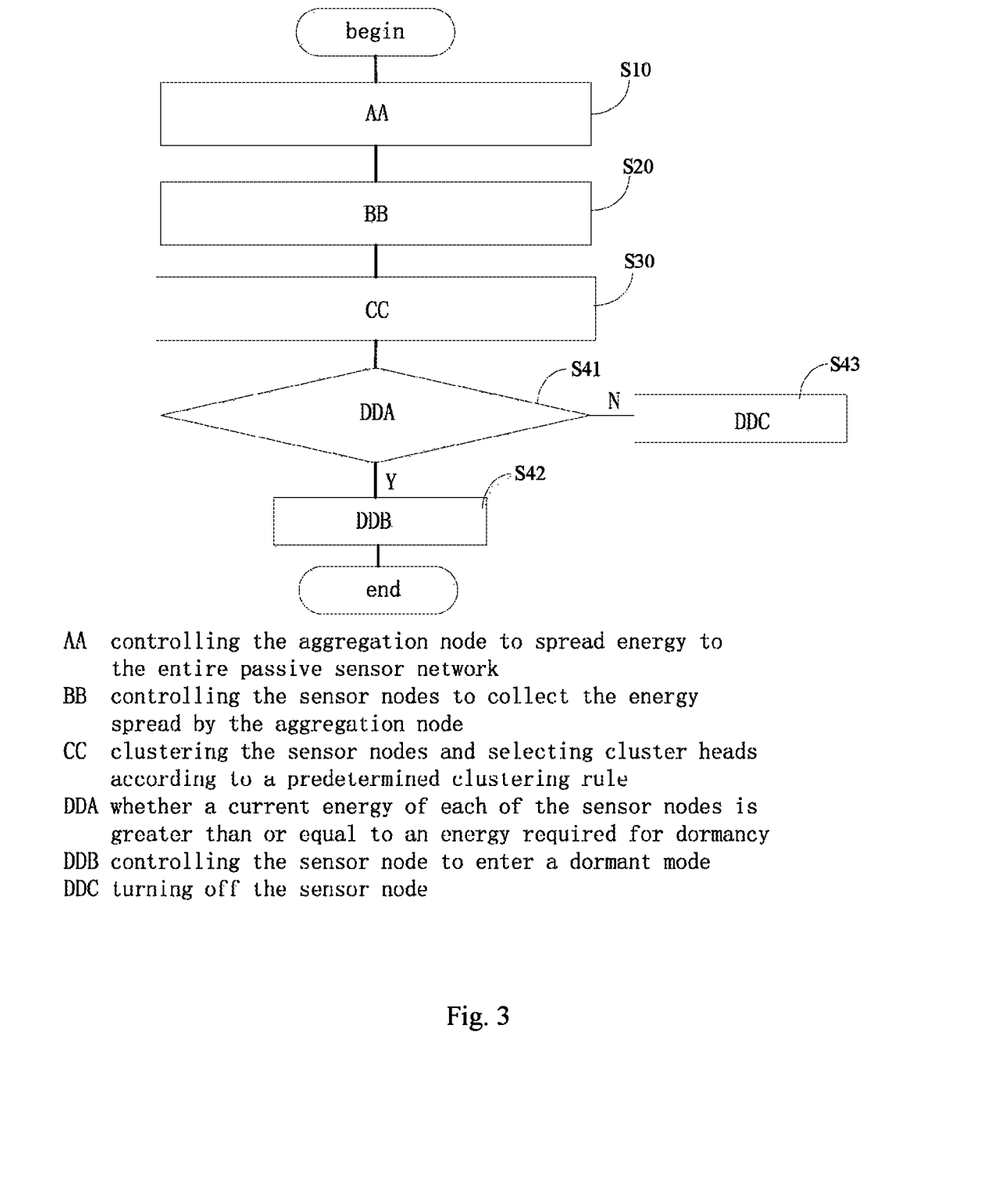
FIG. 3 is another flow chart of the control method according to an embodiment of the present disclosure.

Referring to FIG. 3, in some embodiments, the data transmitting step S40 specifically includes:

step S41 of judging whether a current energy of each of the sensor nodes is greater than or equal to an energy required for dormancy after the data is transmitted by each of the sensor nodes;

step S42 of controlling the sensor node to enter a dormant mode when the current energy is greater than or equal to the energy required for dormancy; and step S43 of controlling to temporarily turn off the sensor node when the current energy is less than the energy required for dormancy.

In some embodiments, the data transmitting module 14 includes a first judging module 141, a first control module 142 and a second control module 143. The step S41 can be realized by the first judging module 141, the step S42 can be realized by the first control module 142, and the step S43 can be realized by the second control module 143.

In other words, the first judging module 141 can be configured to judge whether a current energy of each of the sensor nodes is greater than or equal to an energy required for dormancy after the data is transmitted by each of the sensor nodes. The first control module 142 can be configured to control the sensor node to enter a dormant mode when the current energy is greater than or equal to the energy required for dormancy. The second control module 143 can be configured to control to temporarily turn off the sensor node when the current energy is less than the energy required for dormancy.

In this way, the energy consumption can be reduced through controlling the sensor node completing data transmission to enter a dormant mode or temporarily turning off the sensor node, and after a new round of energy broadcasting process is started, the sensor node temporarily turned off can collect energy and start to operate again.

Figure 4:
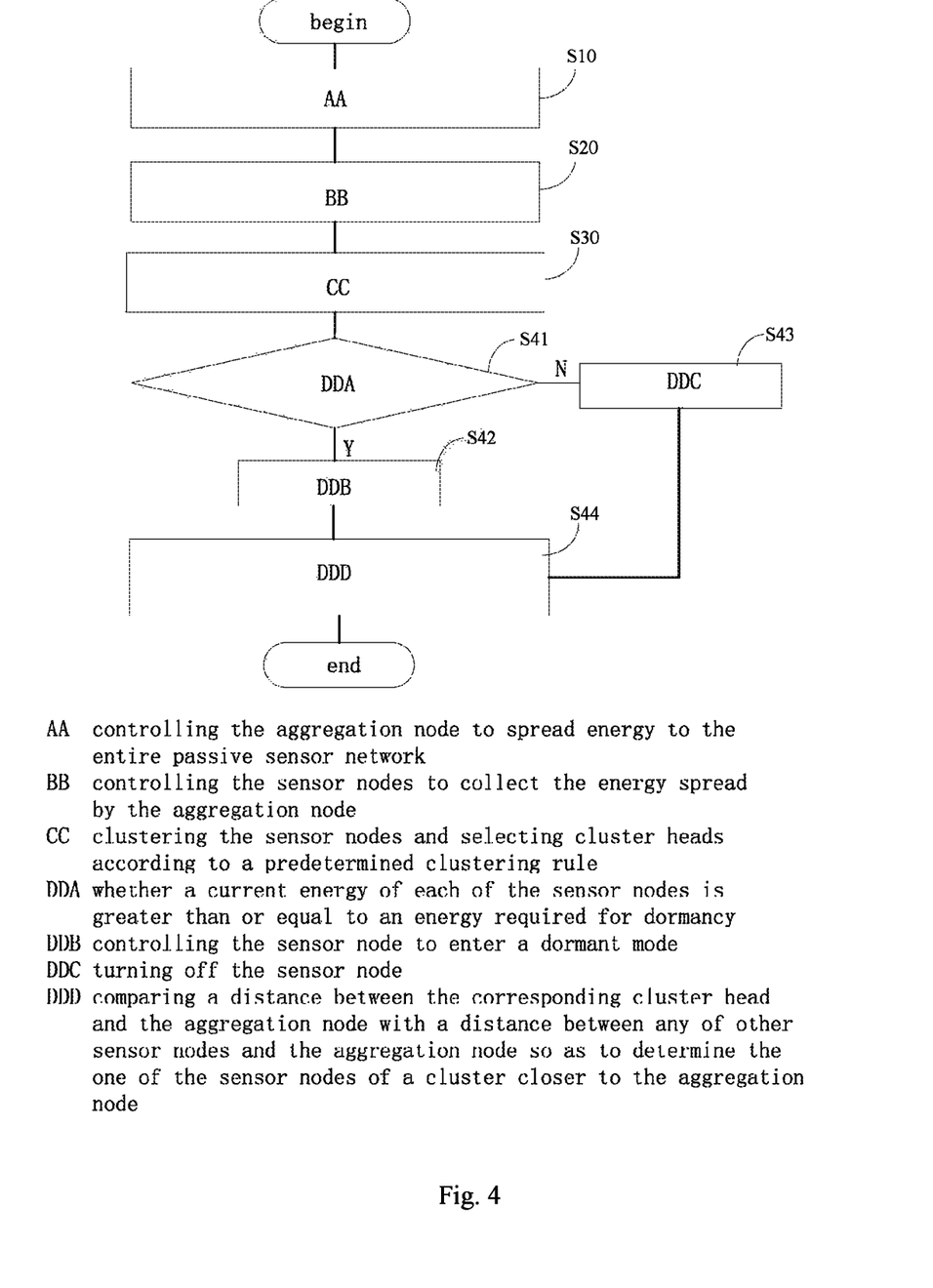
FIG. 4 is still another flow chart of the control method according to an embodiment of the present disclosure.

Referring to FIG. 4, in some embodiments, the data transmitting step S40 specifically includes:

step S44 of comparing a distance between the corresponding cluster head and the aggregation node with a distance between any of other sensor nodes and the aggregation node so as to determine the one of the sensor nodes of a cluster closer to the aggregation node.

In some embodiments, the data transmitting module 14 includes a comparing module 144. The step S44 can be realized by the comparing module 144.

In other words, the comparing module 144 can be configured to compare a distance between the corresponding cluster head and the aggregation node with a distance between any of other sensor nodes and the aggregation node so as to determine the one of the sensor nodes of a cluster closer to the aggregation node.

In this way, the data can be transmitted to the aggregation node from far to near. The sensor nodes closer to the aggregation node can have more energy, after determining the one of the sensor nodes closer to the aggregation node, transmission of the data to the one of the sensor nodes closer to the aggregation node can enable the sensor nodes to have sufficient energy to finally transmit the data to the aggregation node.

Figure 5:
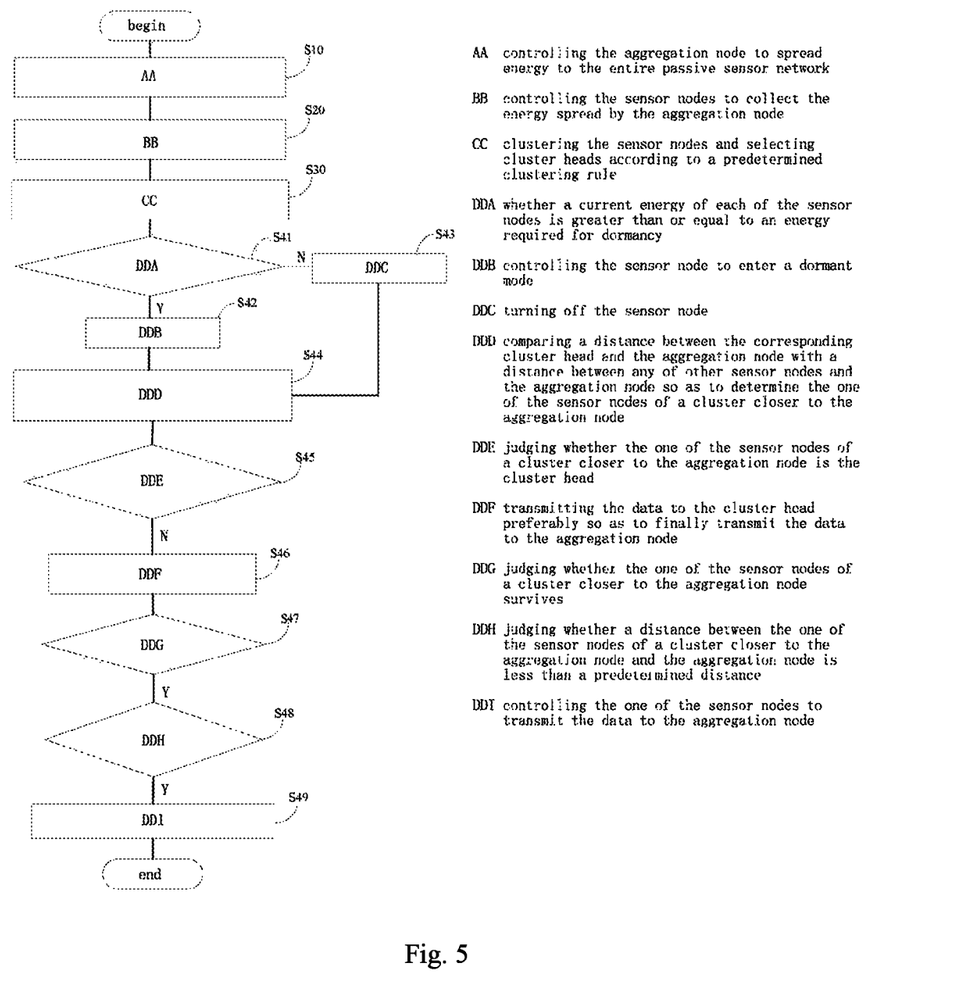
FIG. 5 is yet another flow chart of the control method according to an embodiment of the present disclosure.

Referring to FIG. 5, in some embodiments, the data transmitting step S40 specifically includes:

step S45 of judging whether the one of the sensor nodes of a cluster closer to the aggregation node is the cluster head; and step S46 of transmitting the data to the cluster head preferably so as to finally transmit the data to the aggregation node when the one of the sensor nodes of a cluster closer to the aggregation node is not the cluster head.

In some embodiments, the data transmitting module 14 includes a second judging module 145. The step S45 can be realized by the second judging module 145, and the step S46 can be realized by the data transmitting module 14.

In other words, the second judging module 145 can be configured to judge whether the one of the sensor nodes of a cluster closer to the aggregation node is the cluster head. The data transmitting module 14 can be configured to, when the one of the sensor nodes of a cluster closer to the aggregation node is not the cluster head, transmit the data to the cluster head preferably so as to finally transmit the data to the aggregation node.

The control method in the embodiment of the present disclosure does not necessarily require the sensor nodes or the cluster heads to transmit data to the next cluster head, when the energy of the sensor nodes or the cluster heads is small, the data only needs to be transmitted to the sensor nodes closer to the aggregation node as far as possible, and then the sensor nodes closer to the aggregation node preferably transmit the data to the cluster heads of the sensor nodes. Preferred transmission to the cluster heads of the sensor nodes is corresponding to the foregoing predetermined clustering rule, and in terms of relative position and current energy, the cluster heads are bound to have more advantages than the sensor nodes, and can transmit data more effectively.

In some embodiments, the data transmitting step S40 specifically includes:

step S47 of judging whether the one of the sensor nodes of a cluster closer to the aggregation node survives;

step S48 of judging whether a distance between the one of the sensor nodes of a cluster closer to the aggregation node and the aggregation node is less than a predetermined distance when the one of the sensor nodes of a cluster closer to the aggregation node survives; and step S49 of controlling the one of the sensor nodes of a cluster closer to the aggregation node to transmit the data to the aggregation node when the distance between the one of the sensor nodes of a cluster closer to the aggregation node and the aggregation node is less than the predetermined distance.

In some embodiments, the data transmitting module 14 includes a third judging module 146 and a fourth judging module 147. The step S47 can be realized by the third judging module 146, the step S48 can be realized by the fourth judging module 147, and the step S49 can be realized by the data transmitting module 14.

In other words, the third judging module 146 can be configured to judge whether the one of the sensor nodes of a cluster closer to the aggregation node survives. The fourth judging module 147 can be configured to, when the one of the sensor nodes of a cluster closer to the aggregation node survives, judge whether a distance between the one of the sensor nodes of a cluster closer to the aggregation node and the aggregation node is less than a predetermined distance. The data transmitting module 14 can be configured to, when the distance between the one of the sensor nodes of a cluster closer to the aggregation node and the aggregation node is less than the predetermined distance, control the one of the sensor nodes of a cluster closer to the aggregation node to transmit the data to the aggregation node.

When the distance between the survived sensor node and the aggregation node is less than the predetermined distance, the data can be transmitted to the aggregation node through the sensor nodes. More than one survived sensor nodes with the distance from the aggregation node less than the predetermined distance are arranged. In this way, these sensor nodes can be prevented from transmitting the data to one sensor node closest to the aggregation node, which results in increased transmission times and unnecessary energy consumption.

Figure 6:
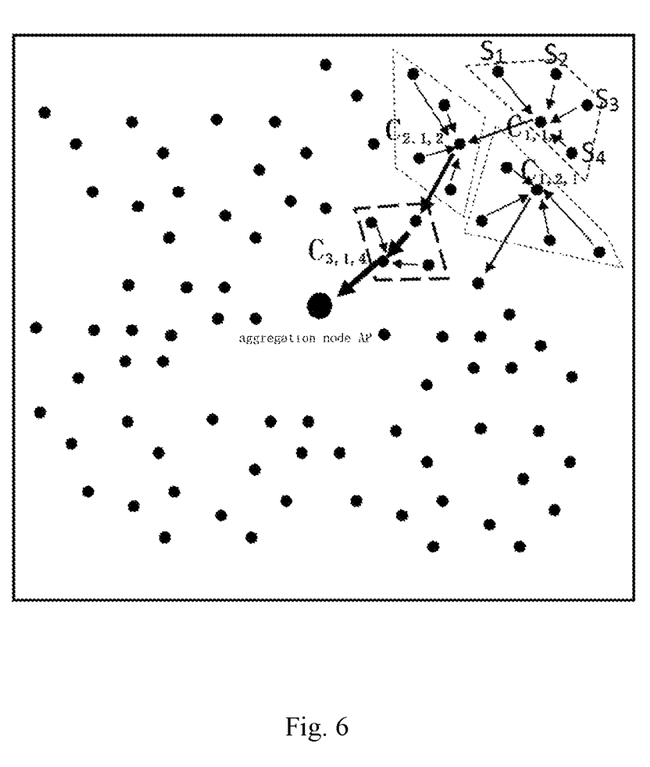
FIG. 6 is a diagram of a wireless sensor network according to an embodiment of the present disclosure.

The control method in the embodiment of the present disclosure is described in detail below by way of example. Referring to FIG. 6, in a wireless sensor network, a sensor node set is $\{S\}=\{S1, \ldots, Sn\}$, where n is a number of sensors in the network. An identification of the aggregation node is AP. The aggregation node AP broadcasts energy to the whole network, and all sensor nodes collect the energy broadcast by the aggregation node AP. In the control method of the embodiment, the energy for the sensor nodes to receive signal, process data and return data comes from the energy broadcast by the aggregation node AP, the sensor nodes far away from the aggregation node AP have relatively poor data processing ability, the nodes close to the aggregation node AP collect much energy, and have more data processing tasks.

According to the clustering rule $f(E_1, \ldots, E_n, d_1, \ldots, d_N)$, several outermost clusters are formed, and the cluster heads are identified as $\{C_{a,b,c}\}$, where a is a number of layers of the clusters currently formed, b is a serial number of the cluster, and c is the transmission times. The number of nodes in each cluster is not always the same. The sensor nodes in the cluster transmit the data to the cluster heads to save energy and enter dormancy or are temporarily turned off if the energy is insufficient.

Some nodes at the outermost layer such as S1 transmit the data to the cluster head C1,m,1 of the nodes, where 1 represents the first layer, m represents a sequence number of the cluster in the second layer, and 1 represents the first transmission. The sensor node of C1,m,1 in the network is marked as $S_{r1}$, where r1 is a specific serial number.

C1,m,1 ($S_{r1}$) transmits the information of the cluster according to the energy of the nodes closer to AP. For example, the data is transmitted to one node $S_{r2}$ that is closer to AP. $S_{r2}$ is not necessarily the cluster head. In the passive sensor network, the sensor node has a higher probability of returning the data to the cluster head of the sensor node, but the data is not 100% transmitted to the cluster head, and a considerable probability that the data can be transmitted to some node in the adjacent cluster or the high-layer cluster exists. When $S_{r2}$ is the cluster head, $S_{r2}$ (C2,n,2) continues to transmit the data to one node $S_{r1}$ closer to AP. When $S_{r2}$ is not the cluster head, $S_{r2}$ transmits the data to the cluster head C2,n,3 of the cluster where $S_{r2}$ is located, where 2 represents the second layer of cluster, n represents a serial number of the cluster at the second layer, and 3 represents the third transmission. If the energy saved by the cluster head C2,n,3 where $S_{r2}$ is located has lower ability to process data, $S_{r2}$ can bypass the cluster head where $S_{r2}$ is located and select some node in the adjacent cluster or the high-layer cluster for transmission.

For example, as shown in the drawing, a data transmitting route is S1→C1,1,1 (Sr1)→C2,1,2(Sr2)→Sr3 (some sensor node)→C3,1,4(Sr4) (where r1, r2, r3 and r4 are some specific serial numbers).

By analogy, the last data can be transmitted to the node $C_{a',b',c'}$ ($S_r$) within a certain range from the aggregation node, and the node $C_{a',b',c'}$ ($S_r$) returns the data to AP. Each node forms own route $\{C_{1,*,*}(S_r), C_{2,*,*}(S_r) \ldots\}$, where * is a serial number, which can change according to the condition of each round of the network.

In this way, each node forms a set of data return routes, the data return routes of the nodes close to the aggregation node AP are included in the routes of the nodes far away from the aggregation node AP.

After the data is returned to the aggregation node AP, this round is ended. The next round is conducted, the aggregation node AP broadcasts energy again, and the nodes return the data according to the rule above. Each round of the data return route is continuously changed. In this way, each of the sensor nodes in the network transmits useful data to the aggregation node with maximum probability during each round of data return.

In the description of the embodiments of the present disclosure, it is to be understood that the orientation or position relationship indicated by the terms such as "center", "longitudinal", "lateral", "length", "width", "thickness", "up", "down", "front", "rear", "left", "right", "vertical", "horizontal", "top", "bottom", "inside", "outside", "clockwise", and "counterclockwise" is the orientation or position relationship based on the drawings, which are merely for the convenience of description to the embodiments of the present invention and the simplification of description, and do not indicate or imply that the device or element referred to must have or operated in a particular orientation. They cannot be seen as limits to the present disclosure. Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment", "some embodiments", "exemplary embodiment", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from scope of the present disclosure.

What is claimed is:

1. A control method for controlling data return in a passive sensor network comprising an aggregation node and sensor nodes, the control method comprising the following steps:
    an energy broadcasting step of controlling the aggregation node to broadcast energy to the entire passive sensor network;

an energy collecting step of controlling the sensor nodes to collect the energy broadcast by the aggregation node;

a clustering step of clustering the sensor nodes and selecting cluster heads according to a predetermined clustering rule; and a data transmitting step of controlling each of the sensor nodes of each cluster to transmit data to a corresponding cluster head and then to the aggregation node or one of the sensor nodes of a cluster closer to the aggregation node so as to eventually transmit the data to the aggregation node, and closing the sensor node that completes data transmission.

2. The control method according to claim 1, wherein the data comprises at least one of the data collected by the sensor node itself and the data transmitted by other sensor nodes.

3. The control method according to claim 1, wherein the data transmitting step specifically comprises:

judging whether a current energy of each of the sensor nodes is greater than or equal to an energy required for dormancy after the data is transmitted by each of the sensor nodes;

controlling the sensor node to enter a dormant mode when the current energy is greater than or equal to the energy required for dormancy; and controlling to temporarily turn off the sensor node when the current energy is less than the energy required for dormancy.

4. The control method according to claim 1, wherein the data transmitting step specifically comprises:

comparing a distance between the corresponding cluster head and the aggregation node with a distance between any of other sensor nodes and the aggregation node so as to determine the one of the sensor nodes of a cluster closer to the aggregation node.

5. The control method according to claim 1, wherein the data transmitting step specifically comprises:

judging whether the one of the sensor nodes of a cluster closer to the aggregation node is the cluster head; and when the one of the sensor nodes of a cluster closer to the aggregation node is not the cluster head, transmitting the data to the cluster head preferably so as to finally transmit the data to the aggregation node.

6. The control method according to claim 1, wherein the data transmitting step specifically comprises:

judging whether the one of the sensor nodes of a cluster closer to the aggregation node survives;

when the one of the sensor nodes of a cluster closer to the aggregation node survives, judging whether a distance between the one of the sensor nodes of a cluster closer to the aggregation node and the aggregation node is less than a predetermined distance; and when the distance between the one of the sensor nodes of a cluster closer to the aggregation node and the aggregation node is less than the predetermined distance, controlling the one of the sensor nodes of a cluster closer to the aggregation node to transmit the data to the aggregation node.

7. A control device for controlling data return in a passive sensor network comprising an aggregation node and sensor nodes, the control device comprising:

an energy broadcasting module configured to control the aggregation node to broadcast energy to the entire passive sensor network;

an energy collecting module configured to control the sensor node to collect the energy broadcast by the aggregation node;

a clustering module configured to cluster the sensor nodes and select cluster heads according to a predetermined clustering rule; and a data transmitting module configured to control each of the sensor nodes of each cluster to transmit data to a corresponding cluster head and then to the aggregation node or one of the sensor nodes of a cluster closer to the aggregation node so as to eventually transmit the data to the aggregation node, and close the sensor node that completes data transmission.

8. The control device according to claim 7, wherein the data comprises at least one of the data collected by the sensor node itself and the data transmitted by other sensor nodes.

9. The control device according to claim 7, wherein the data transmitting module comprises:

a first judging module configured to judge whether a current energy of each of the sensor nodes is greater than or equal to an energy required for dormancy after the data is transmitted by each of the sensor nodes;

a first control module configured to control the sensor node to enter a dormant mode when the current energy is greater than or equal to the energy required for dormancy; and a second control module configured to control to temporarily turn off the sensor node when the current energy is less than the energy required for dormancy.

10. The control device according to claim 7, wherein the data transmitting module comprises:

a comparing module configured to compare a distance between the corresponding cluster head and the aggregation node with a distance between any of other sensor nodes and the aggregation node so as to determine the one of the sensor nodes of a cluster closer to the aggregation node.

11. The control device according to claim 7, wherein the data transmitting module comprises:

a second judging module configured to judge whether the one of the sensor nodes of a cluster closer to the aggregation node is the cluster head; and the data transmitting module is configured to, when the one of the sensor nodes of a cluster closer to the aggregation node is not the cluster head, transmit the data to the cluster head preferably so as to finally transmit the data to the aggregation node.

12. The control device according to claim 7, wherein the data transmitting module comprises:

a third judging module configured to judge whether the one of the sensor nodes of a cluster closer to the aggregation node survives;

a fourth judging module configured to, when the one of the sensor nodes of a cluster closer to the aggregation node survives, judge whether a distance between the one of the sensor nodes of a cluster closer to the aggregation node and the aggregation node is less than a predetermined distance; and the data transmitting module is configured to, when the distance between the one of the sensor nodes of a cluster closer to the aggregation node and the aggregation node is less than the predetermined distance, control the one of the sensor nodes of a cluster closer to the aggregation node to transmit the data to the aggregation node.

* * * * *